May 13, 1969 P. D. C. REEFMAN 3,444,388

PULSE TRANSFORMER COUNTING CIRCUIT

Filed Dec. 24, 1964

INVENTOR.
PIETER D. C. REEFMAN

BY Hugh A. Kirk

ATTORNEY

United States Patent Office 3,444,388

Patented May 13, 1969

3,444,388

PULSE TRANSFORMER COUNTING CIRCUIT

Pieter David Cornelis Reefman, The Hague, Netherlands, assignor to De Staat der Nederlanden, Ten Deze Vertegenwoordigd Door de Directeur-Generaal der Posterijen, Telegrafie en Telefonie, The Hague, Netherlands Filed Dec. 24, 1964, Ser. No. 420,989
Claims priority, application Netherlands, Dec. 31, 1963, 302,796
Int. H01f *27/42*
U.S. Cl. 307—88 10 Claims

ABSTRACT OF THE DISCLOSURE

An apparatus for transmitting information by means of a material having a practically rectangular hysteresis loop as a core material which acts both as a memory and a transformer, the core being provided with a winding to which pulses are supplied, and from which impulses are detected and/or dissipated. The total volt-second content of the hysteresis loop between the two saturated states is divided into a whole number of parts.

Thus the method of operating the apparatus of this invention comprises reading-out a multistable core by using the core as a transformer connected to a dissipating element.

*Background of the invention*

The principle of the multistable magnetic memory circuit is known from the "Nachrichten Technische Zeitung, 1961, No. 2, pp. 81 to 87. In such circuits, however, there is always a device by means of which it can be ascertained whether the core is in the unsaturated state or in the saturated state, the transition from the unsaturated state to the saturated state being determined by some discriminating circuit. The discriminating pulse occurring then must be subtracted from the total number of pulses later on to obtain the correct count. Thus a code conversion takes place.

*Summary of the invention*

According to this invention recording takes place by supplying pulses of a given volt-second content. Reading-out can be done by supplying pulses of the given volt-second content but of the opposite polarity to those stored in the memory element or magnetic core having a dissipating element at the output terminal for judging the energy content of the delivered pulses. Reading-out can also be done by supplying to the memory element pulses of the given volt-second content and of the same polarity. In this case the result of the count is the complement of the number of counting pulses stored in the core.

According to this invention the dissipating element is so connected to the output terminals that only the number of recorded counting pulses is derived directly from the core; and thus no code conversion is needed. Furthermore, according to the invention, the number of reading pulses can be taken in any amount larger than the maximum number of pulses recorded. Thus in the memory circuit according to this invention, the indication of the saturated condition is dispensed with and only the recorded counting-pulses find direct expression at the output terminal of the memory.

A still further application of the apparatus according to this invention is in the field of transformers. The number of pulses to be transformed via the unsaturated core depends on the adjusted dosage of the magnetization by an accurate apportioning of the volt-second contents of the applied positive or negative voltage pulses.

*Brief description of the views*

The above mentioned and other features and objects of this invention and the manner of attaining them will become more apparent and the invention itself will be understood best by reference to the following description of embodiments of the invention taken in conjunction with the accompanying drawing, wherein.

Figure 2:
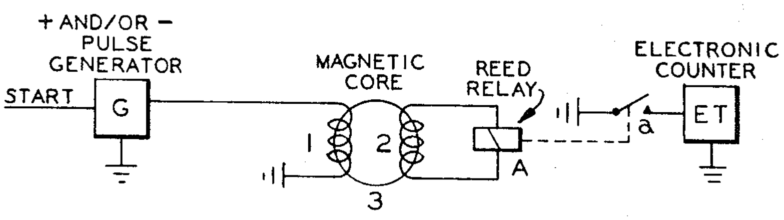
FIG. 2 is a schematic wiring diagram of a counting circuit according to one embodiment of this invention.
Figure 2A:
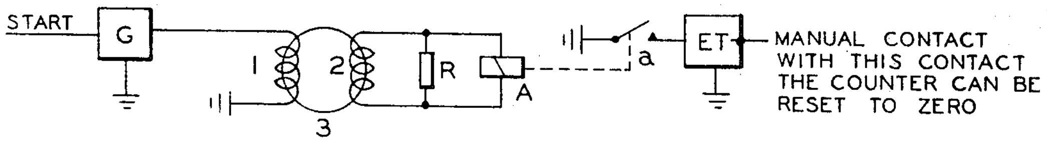
Figure 2B:
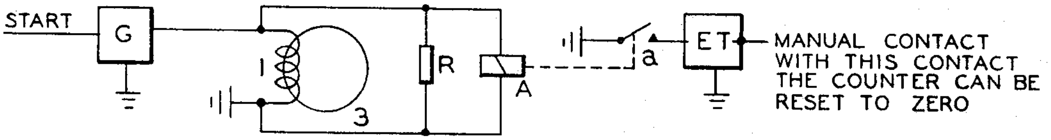
Figure 3:
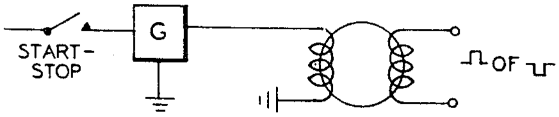

FIG. 2*a* is a schematic wiring diagram of a counting circuit according to another embodiment of the invention similar to FIG. 2, but employing a resistor in parallel with the reed relay;

FIG. 2*b* is a schematic wiring diagram of a counting circuit according to a further embodiment of this invention similar to FIG. 2*a*, comprising one winding on the magnetic core to which both the generator and the reed relay are connected; and FIG. 3 is a schematic wiring diagram of a counting circuit according to still another embodiment of this invention wherein the magnetic core comprises a transformer.

Figure 1:
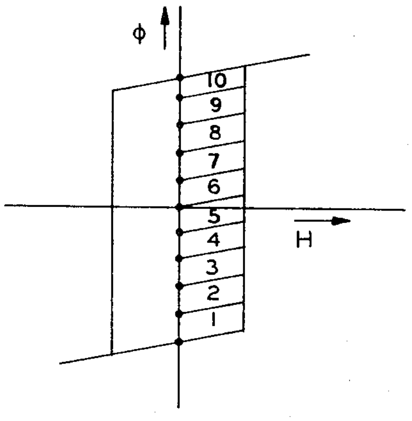
FIG. 1 is a graph of a substantially rectangular hysteresis loop divided according to ten volt-second pulses applied thereto.

In an embodiment according to the invention the volt-second contents of the applied voltage pulses are so chosen that the saturation flux $\Phi_v$ is just reached in ten pulses (see FIG. 1). FIG. 2 shows a counting circuit therefor, comprising a generator G which dispenses pulses of apportioned volt-second content to the winding 1 on the core 3 of magnetic material having a practically rectangular hysteresis loop. If the core 3 is saturated when a pulse is applied to the winding 1, there occurs a reversible flux change. This flux change causes in the winding 2 a very narrow voltage peak to which an electronic counter can respond. To prevent this, a dissipating element, which judges the energy content of the delivered pulse, is inserted between the second winding and the electronic counter ET. In this embodiment, a reed relay A has been chosen as such a dissipating element. This reed relay A then may actuate a contact *a* in the electronic counter circuit ET.

The object aimed at can also be attained by means of one winding to which the generator G as well as the reed relay A are connected (see FIG. 2*b*) in which the one winding or coil 1 of the magnetic core is connected in parallel with the generator G and the dissipating circuit A, so that this one coil 1 acts both as a primary and a secondary coil of a transformer. A further adjustment of the dissipating element A connected to the coil 2 acting as a secondary of the transformer can be obtained by means of a resistor R connected in parallel to the reed relay (see FIGS. 2*a* and 2*b*).

Now suppose the total volt-second content of the hysteresis loop is divided into ten equal parts as is indicated in FIG. 1. Further suppose that four counting pulses are recorded by means of the generator G. The electronic counter ET then will be in its fourth state. Next the content of the counter is wiped out, which can be done manually, and the generator G is connected to the winding 1 again in such a way that the polarity of the voltage pulses is reversed. In that case the counter will count to four again, irrespective of the number of pulses delivered by the generator, providing the number delivered is larger than the number of pulses recorded. The polarity of the reading pulses can also be taken equal to that of the recording pulses. In that case the counter will indicate the complement of the number of pulses stored in the core, which in this case is six.

FIG. 3 illustrates the application of the apparatus to a transformer. For example, assume that the total volt-second content of the hysteresis loop is divided into ten parts.

The core is at the lower saturation point. Now three voltage pulses having a positive polarity and an apportioned volt-second content are supplied to the primary winding. Pulses then also appear at the secondary winding, as well as the core being magnetized to the corresponding magnetizing point. Whatever is the number of positive voltage pulses applied to the primary winding then, the secondary winding will never deliver more than seven pulses, whereas in the case of any number of negative pulses applied, the secondary winding will never deliver more than three pulses.

Another possibility consists in pushing on the division of the total volt-second content of the hysteresis loop into equal parts to just above the saturation limit.

Further it proved possible to increase the number of parts the hysteresis loop is divided into to any number between 20 or 30.

An application of this pulse transformer is in recording decimal digits in automatic telephone registers.

While there is described above the principles of this invention in connection with specific apparatus, it is to be clearly understood that such is merely exemplary and that numerous modifications and rearrangements may be made therein, without departing from the essence of this invention.

I claim:

1. A counting circuit with memory function comprising:

(a) a magnetic core having a substantially rectangular hysteresis loop, and at least one coil connected thereto which may act as a primary and a secondary coil of a transformer, (b) a pulse generator connected to the coil acting as a primary coil and generating equal volt-second pulses of a content apportioned to the divisions of said hysteresis loop of said coil between its two saturated states into a whole number of parts, (c) a dissipating device connected to the coil acting as a secondary and responsive to each pulse stored on and removed from said core, when said pulses are stored and removed up to the whole number content of said core, and (d) an electronic counter controlled by said dissipating device.

2. A circuit according to claim 1 including:

(e) means for resetting said counter, whereby said counter after its resetting only counts the number of additional pulses applied to said primary which drive said core to one of its saturated states from the number of pulses stored in said core at the time of reset.

3. A circuit according to claim 1 wherein said dissipating device comprises a reed relay in a circuit of one of said coils, and a switch contact in the circuit of said electronic counter.

4. A circuit according to claim 1 wherein said magnetic core comprises a transformer having separate primary and secondary coils.

5. A circuit according to claim 1 wherein said pulse generator comprises means for generating pulses of both positive and negative content.

6. A pulse transformer counting circuit with memory comprising:

(a) a magnetic core (3) having a substantially rectangular hysteresis loop, and at least one coil (1) and/or (2) connected thereto which may act both as a primary and a secondary coil of a transformer, (b) a pulse generator (G) connected to said coil acting as a primary coil for feeding pulses into said coil of said core with a volt-second content less than and apportioned to the volt-second content of said core, and (c) a dissipating device (A) connected to said coil acting as a secondary coil of the transformer for counting the number of pulses of a predetermined value produced from said core by said pulses fed to said core by said pulse generator.

7. A circuit according to claim 6 including an electronic counter (ET) controlled by said dissipating device.

8. A circuit according to claim 7 including means for resetting said counter.

9. A circuit according to claim 6 wherein said dissipating device comprises a reed relay connected to said coil acting as a secondary coil of the transformer.

10. A circuit according to claim 6 wherein said pulse generator said pulse generator comprises means for generating pulses of both positive and negative content.

References Cited

UNITED STATES PATENTS

| | | | |
|---|---|---|---|
| 2,808,578 | 10/1957 | Goodell et al. | 340—174 |
| 2,958,077 | 10/1960 | Svala | 340—174 |
| 3,075,084 | 1/1963 | De Miranda et al. | 307—88 |

BERNARD KONICK, *Primary Examiner.*

JOSEPH F. BREIMAYER, *Assistant Examiner.*

U.S. Cl. X.R.

179—18